United States Patent
White

(10) Patent No.: US 11,902,549 B1
(45) Date of Patent: *Feb. 13, 2024

(54) INFORMATION CENTRIC NETWORKING (ICN) MEDIA STREAMING

(71) Applicant: Cable Television Laboratories, Inc., Louisville, CO (US)

(72) Inventor: Gregory C. White, Louisville, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 104 days.

This patent is subject to a terminal disclaimer.

(21) Appl. No.: 17/568,513

(22) Filed: Jan. 4, 2022

Related U.S. Application Data

(63) Continuation of application No. 16/133,071, filed on Sep. 17, 2018, now Pat. No. 11,218,711.

(60) Provisional application No. 62/558,919, filed on Sep. 15, 2017.

(51) Int. Cl.

| | |
|---|---|
| *H04N 19/34* | (2014.01) |
| *H04N 19/39* | (2014.01) |
| *H04N 19/187* | (2014.01) |
| *H04N 21/60* | (2011.01) |
| *H04N 19/30* | (2014.01) |
| *H04N 19/20* | (2014.01) |
| *H04N 19/167* | (2014.01) |
| *H04L 47/2441* | (2022.01) |

(52) U.S. Cl.
CPC ........ *H04N 19/34* (2014.11); *H04N 19/167* (2014.11); *H04N 19/187* (2014.11); *H04N 19/39* (2014.11); *H04N 21/60* (2013.01); *H04L 47/2441* (2013.01); *H04N 19/20* (2014.11); *H04N 19/30* (2014.11)

(58) Field of Classification Search
CPC ...... H04N 19/34; H04N 19/39; H04N 19/167; H04N 19/187; H04N 19/00
See application file for complete search history.

(56) References Cited

U.S. PATENT DOCUMENTS

| | | | | |
|---|---|---|---|---|
| 7,289,506 B1 | * | 10/2007 | Hannuksela | H04N 19/31 375/E7.091 |
| 10,069,729 B2 | * | 9/2018 | Wood | H04L 47/2475 |
| 2006/0164987 A1 | | 7/2006 | ruiz | |
| 2009/0285217 A1 | | 11/2009 | frink | |
| 2011/0282945 A1 | | 11/2011 | thyni | |
| 2013/0031211 A1 | * | 1/2013 | Johnson | H04L 67/1008 709/218 |

(Continued)

OTHER PUBLICATIONS

Li et al. "Rate Selective Caching for Adaptive Streaming over Information-Centric Networks" IEEE Transactions on Computers, vol. 66, No. 9 (Year: 2017).

(Continued)

*Primary Examiner* — Kyle M Lotfi
(74) *Attorney, Agent, or Firm* — Josh C. Snider; Snider IP

(57) ABSTRACT

Media streaming is contemplated, such as but not necessarily limited to facilitating streaming of audio, video, etc. over networks operating according to Information Center Networking (ICN) principles. The media streaming may be facilitated with a request-response protocol of ICN being leveraged to enable streaming media at infinite scalability without a priori knowledge or guarantee of network resources and bandwidth.

20 Claims, 7 Drawing Sheets

(56) References Cited

U.S. PATENT DOCUMENTS

| | | |
|---|---|---|
| 2013/0251031 A1 | 9/2013 | Yitschak |
| 2016/0142508 A1 | 5/2016 | ishihara |
| 2016/0142510 A1 | 5/2016 | Westphal |
| 2017/0134276 A1 | 5/2017 | white |
| 2017/0150165 A1 | 5/2017 | Na |
| 2018/0013661 A1* | 1/2018 | Wood .................... H04L 45/021 |
| 2018/0091821 A1 | 3/2018 | Jeon |
| 2018/0131673 A1 | 5/2018 | white |
| 2018/0242218 A1 | 8/2018 | muscariello |
| 2019/0037042 A1 | 1/2019 | kwak |
| 2019/0356575 A1* | 11/2019 | Inam ....................... H04W 8/04 |
| 2020/0137462 A1 | 4/2020 | he |

OTHER PUBLICATIONS

Ullah et al., "Delivering Scalable Video Streaming in ICN Enabled Long Term Evolution Networks." (Year: 2016).

\* cited by examiner

INFORMATION CENTRIC NETWORKING (ICN) MEDIA STREAMING

CROSS-REFERENCE TO RELATED APPLICATIONS

This application is continuation of U.S. application Ser. No. 16/133,071, filed Sep. 17, 2018, which in turn claims the benefit of U.S. provisional application No. 62/558,919 filed Sep. 15, 2017, the disclosures of which are incorporated in their entireties by reference herein.

TECHNICAL FIELD

The present invention relates to media streaming, such as but not necessarily limited to facilitating streaming of audio, video, etc. over networks operating according to Information Center Networking (ICN) principles.

BACKGROUND

Information Centric Networking (ICN) is an emerging networking approach that aims to compensate for many of the shortcomings inherent in the Internet Protocol (IP), particularly in current networks and in the networks envisioned in the future. One specific approach to Information Centric Networking, also known as Content Centric Networking (CCN) and/or Named Data Networking (NDN), appears to be gaining mindshare in the research community and in industry, and promises to significantly improve network scalability, performance, and reduce cost over a network built on the Internet Protocol (IP). CCN/NDN provides native and elegant support for client mobility, multipath connectivity, multicast delivery and in-network caching; many of which are critical for current and future networks, and all of which require inefficient and/or complex managed overlays when implemented in IP. Further, CCN/NDN may provide a much richer addressing framework than that existing in IP, which could eliminate significant sources of routing complexity. One non-limiting aspect of the present invention contemplates leveraging these and other operational benefits of ICN, CCN, NDN, etc. to facilitate media streaming.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
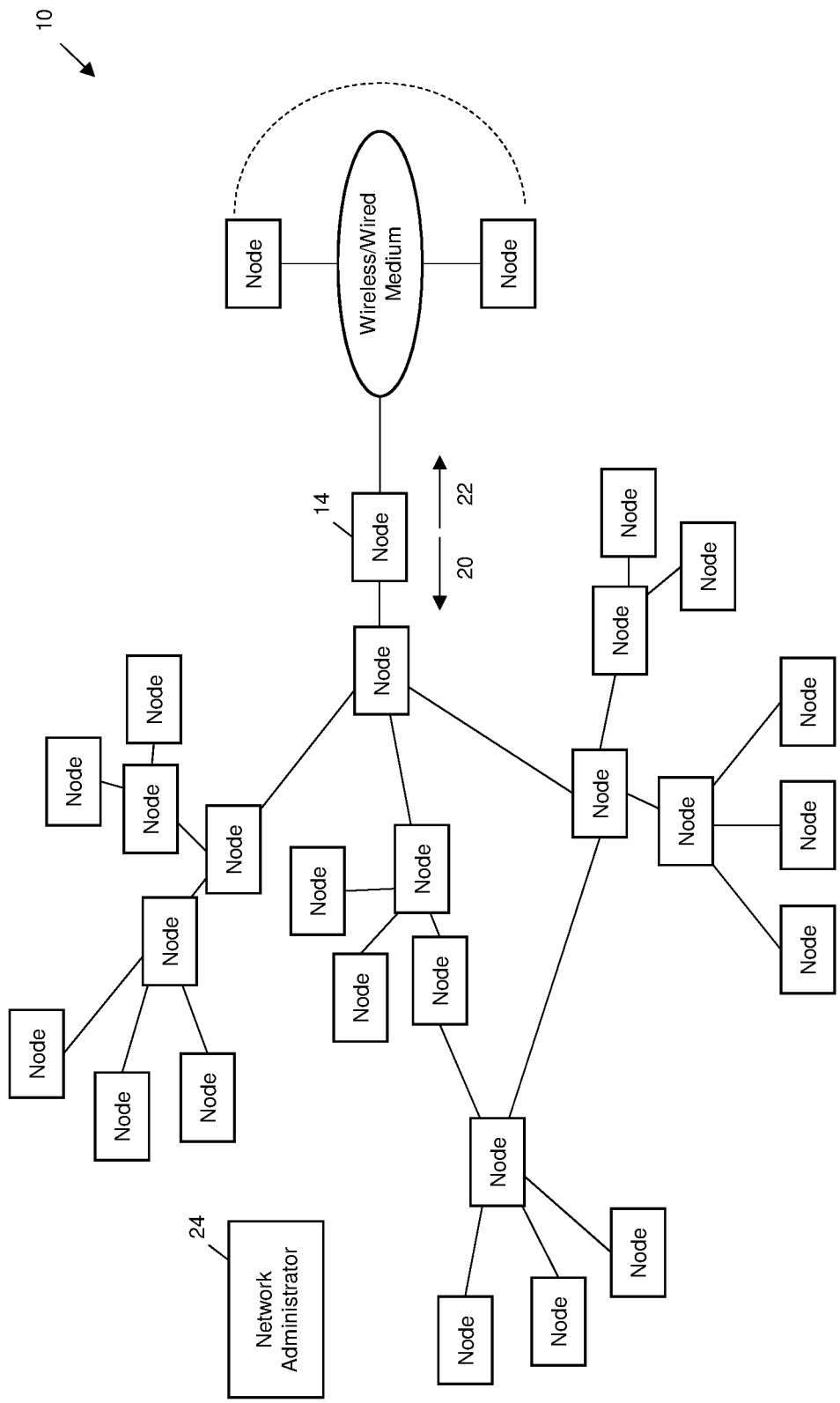
FIG. 1 illustrates a network in accordance with one non-limiting aspect of the present invention.

FIG. 1 illustrates a network 10 in accordance with one non-limiting aspect of the present invention. The network 10 may be configured to operate according to any suitable response and request protocol whereby content, data, objects, files, information, signaling, messages, etc. may be routed according to locally and/or globally unique names associated therewith. The network 10 may facilitate message routing according to Information Centric Networking (ICN) principles, such as but not necessarily limited those associated with Name Data Networking (NDN) or Content Centric Network (CCN) principles, including in the manner described in U.S. application Ser. No. 16/133,409, entitled Content Centric Message Forwarding, U.S. application Ser. No. 15/345,333, entitled Preemptive Caching of Content in a Content-Centric Network and/or U.S. application Ser. No. 15/615,022, entitled Internet Protocol over a Content-Centric Network (IPoC), the disclosures of which are hereby incorporated by reference in their entireties herein. The network 10 may be configured to operate in a manner commensurate with the processes, messaging and other operations described within CCNx Semantics (draft-irtf-icnrg-ccnxsemantics-09) as published by The Internet Engineering Task Force (IETF), Jun. 27, 2018, and/or CCN 1.0 Protocol Architecture as published by Marc Mosko, Ignacio Solis, Ersin Uzun of the Palo Alto Research Center, the disclosures of which are hereby incorporated by reference in their entireties herein. The network 10 is shown to include a plurality of nodes configured to facilitate forwarding messages for clients (not shown) connected thereto or otherwise associated therewith, e.g., each node may be configured to facilitate routing, forwarding, relaying, processing or otherwise exchanging upstream and downstream signaling for one or more clients associated therewith.

The network 10 is shown to include a wired, wireless and/or combined wireless and wired medium to facilitate communications between a plurality of nodes. A boundary node 14 may be positioned so as to have a plurality of nodes connected downstream therefrom. The node 14 may be characterized as an edge or boundary node as all signaling between nodes connected downstream therefrom, which may be referred to as interior nodes 20, and nodes connected upstream therefrom, which may be referred to as exterior nodes 22, must pass through the boundary node 14. The illustrated interconnection of nodes is shown for exemplary, non-limiting purposes as the network 10 may employ any number of wired and/or wireless connections between the nodes. The managed network may be associated with a particular Internet Service Provider (ISP) under the control or instruction of a network administrator 24. The administrator 24 may be included to facilitate managing or otherwise controlling communications over the managed network, such as to facilitate a implementation of the process and operations contemplated herein to diminish reliance on stateful storage of information utilized to facilitate message routing.

The contemplated ICN principles may utilize any number of packet types and is predominantly described with respect to use of an "interest" packet and a "data" packet (while both CCN/NDN use the term "interest", CCN refers to the data packet as a "content object"). The present invention references a request for a piece of content to occur with issuance of an interest and a response thereto, i.e., delivery of the requested piece of content, to occur with issuance of a content object for non-limiting purposes as the present invention fully contemplates its use and application with other types of protocols, messaging or nomenclatures. One non-limiting aspect of the present invention contemplates message forwarding according to non-IP addressing or other protocols requiring a connection or identification of a source/destination associated with the corresponding message, packet, etc. in favor of the content-centric naming. An interest may be used to identify the resource, e.g., piece of content, that is being requested, which may be identified by a name that includes provenance whereby, in some cases, the name uniquely (in a global sense) may identify a specific content object, and in other cases it may contain wildcards that indicate that any of a set of content objects that could satisfy the request.

When a client or another device (not shown) connected to one of the nodes launches an interest (packet, message, etc.) into the network 10, it expects a corresponding content object in response. Notably, the interest may not identify the client (sender) in any way and it may include other fields to refine the request in certain ways. NDN provides several "selectors" for this purpose and CCN includes two additional optional fields: a content object hash and a KeyID. A content object may include the name of the resource, piece of content, etc. included therein. One principal is that a content object is a uniquely named resource chunk. It could be an entire resource, or a small fragment of one, but in either case, it is uniquely identified by a name field. In addition to the name field and the resource itself, the content object may contains either a hash or a digital signature that can be used by a recipient to verify provenance. In the case of NDN, each content object may be required to contain a digital signature along with an identifier of the signing key, which allows the packet to be validated by any node in the network. CCN introduces the possibility of using a content object hash, which can be used along with other information to establish provenance as will be described further below.

Structuring names for data objects is an open area of research in the ICN space. In particular, whether names are hierarchical or flat is an area of debate, with pros and cons identified for both approaches. In CCN/NDN names are composed of an arbitrary-length prefix (which is hierarchical) followed by a portion that may or may not be hierarchical. CCN/NDN names commonly resemble a URL, e.g., cablelabs.com/specs/main.html, however the resemblance is largely superficial, because the first element is not intended to be a DNS resolvable name, and a name may not be required to be human-readable. The use of a hierarchical prefix allows for route aggregation in intermediate routers, which is intended to simplify routing. The CCN/NDN architecture may include a trust model for validating packet signatures. Every device that is capable of acting as a source of information (which is practically every networked device) may need one or more certificates to authenticate its content to others, as well as to announce itself to the network as an authoritative source. Developing a trusted means to distribute the certificates, and to establish and convey trust in them is still being researched.

Figure 2:
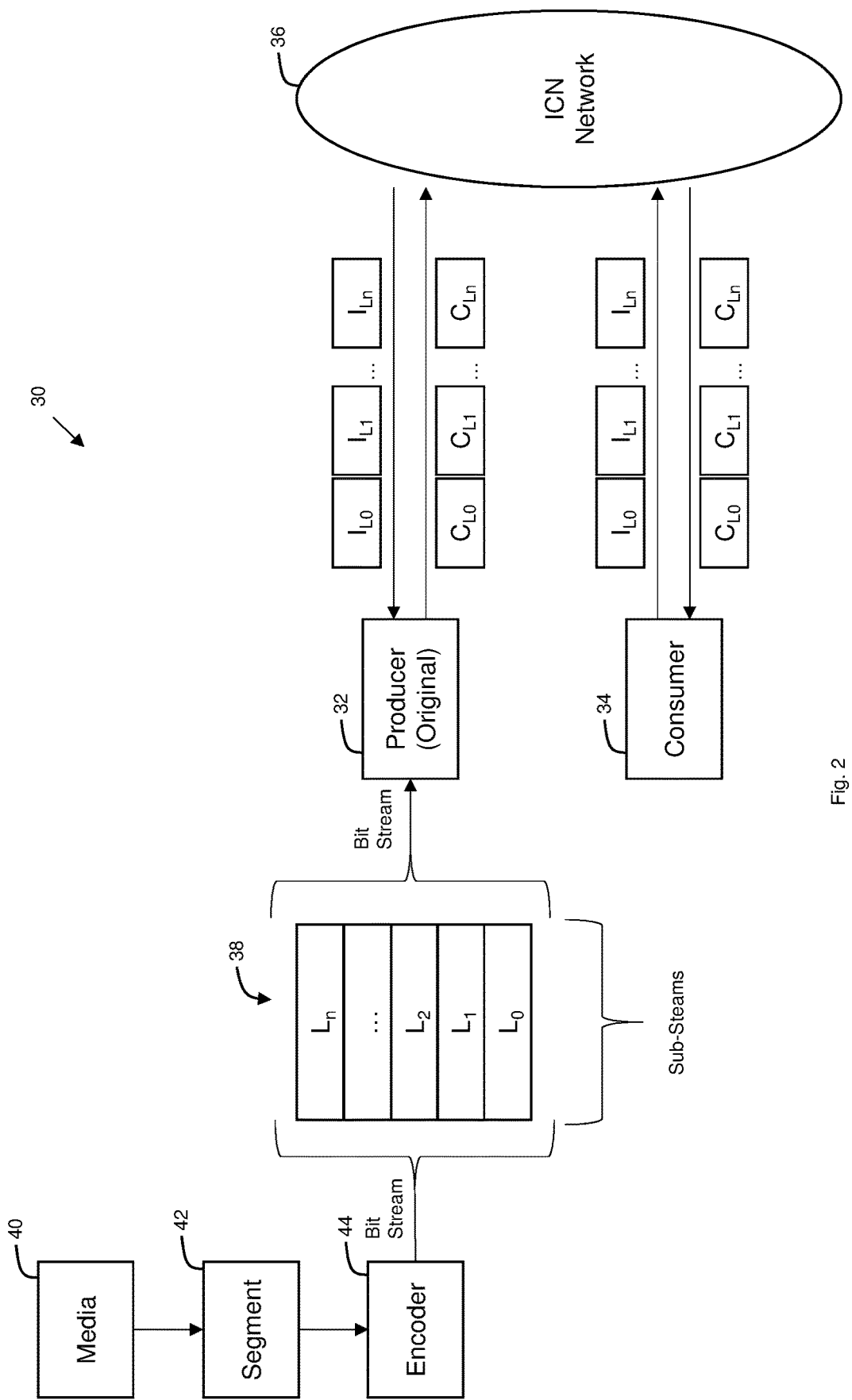
FIG. 2 illustrates a diagram for media streaming in accordance with one non-limiting aspect of the present invention.

FIG. 2 illustrates a diagram 30 for media streaming in accordance with one non-limiting aspect of the present invention. The diagram illustrates media being streamed from a producer 32 to a consumer 34 over a network 36 operating according to ICN principles whereby each packet, container or other delivery constructed is requested with an interest (I) and supplied within a content object (C). The forwarding, routing and communications manipulations associated with the interests and the content objects being processed by various nodes in the network 36 are omitted for exemplary purposes with the understanding of the corresponding messaging traveling through the network 36 in a connection-less way and/or a non-IP way according to ICN principles, such as in the manner described with respect to FIG. 1 and the patent applications incorporated by reference herein. A singular producer 32 and a singular consumer 34 are illustrated for exemplary non-limiting purposes to facilitate describing some of the processes and operations contemplated herein to enable media streaming over the network 36. A media stream 38 is also described for exemplary, non-limiting purposes as a media/video 40 comprised of a plurality of audio and visual components, frames, etc., such as one created according to Moving Picture Expert Groups (MPEG) or others, even though the present invention fully contemplates its use and application with any type of media.

One non-limiting aspect of the present invention contemplates the video, i.e., the individual pictures, frames, audio, etc., being generated as a plurality of discrete access units that may be assembled into segments 42 for subsequent coding with an encoder 44 into the media stream 38. One contemplated method for coding the video 40 may be characterized as Scalable Video Coding (SVC) or Scalable High Efficiency Video Coding (SHEVC), such as that in compliance with Annex G extension of the H.264/MPEG-4 AVC video compression standard, whereby the video, e.g., a video bitstream of high-quality video from a content provider, may be encoded to a bitstream 38 having one or more sub-streams ($L_0$, $L_1$, $L_2$, $L_3$ ... $L_N$). The audio/visual/media/video stream being encoded may be segmented into GOPs of a chosen duration (e.g. 0.5 seconds, 2 seconds, or 10 seconds). Each chunk may be encoded as a standalone compressed video segment (i.e. each compressed video segment may be playable independently from others) with a base layer (BL) and a number of enhancement layers (ELs) as chosen by the content producer. The BL may represent the lowest acceptable quality level for the segment, the lowest acceptable frame rate for the segment, the lowest acceptable resolution for the segment or any combination. In one example case, the BL may contain only an encoding of the initial I-frame in the video sequence, thus making the sequence of BL segments appropriate for dual-usage as a "trick-mode" track for fast-forward and fast-reverse functions. The encoded data for each segment may be formatted into a container such that the BL is formatted into the container first and subsequent portions of the container containing EL information in sequence from lowest to highest quality/resolution/frame rate.

Figure 3:
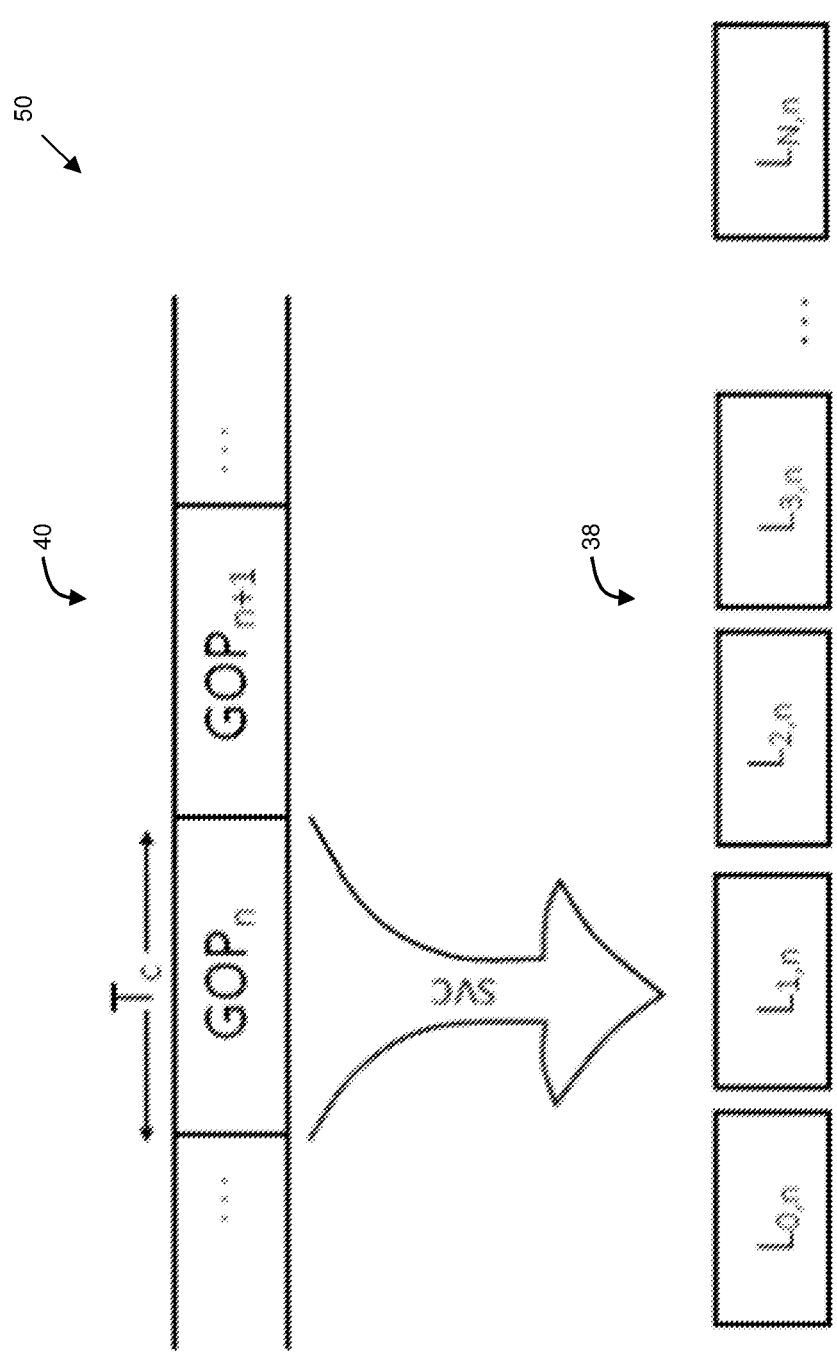
FIG. 3 illustrates a diagram of scalable encoding in accordance with one non-limiting aspect of the present invention.

FIG. 3 illustrates a diagram 50 of scalable encoding media/video in accordance with one non-limiting aspect of the present invention whereby GOPs are divided according to a selectable segment duration (Tc) with each segment (GOP, $GOP_{n+1}$, etc.) being scalably encoded into a bitstream having a plurality of sub-streams. The bitstream 38 may be hierarchical in that the sub-streams may be coded according to a layering scheme whereby each layer ($L_0$, $L_1$, $L_2$, $L_3$ ... $L_N$) includes an interdependency sufficient to enable a decoder to process one or more of the layers for playback of media/video associated with an attendant scalability. One non-limiting aspect of the present invention contemplates the scalable video encoding resulting in a monotonical increase in video quality in proportion to the number of sub-streams being processed. The scalable video coding may be characterized by the BL ($L_0$) providing interdependency with any number of ELs ($L_1, L_2, L_3 \ldots L_N$) whereby the ELs may be combinable with the BL to increase quality (resolution, frame rate, efficiency, compression, etc.) in proportion to the number of ELs being combined/composited. One non-limiting aspect of the present invention contemplates any number of ELs being generated depending on desired variations in quality, i.e., the quantity of ELs and the gradient or difference in quality between each EL may be generated according to any desired range(s) of quality. The ability to scalably encode the video at virtually any level of granularity, i.e., with any desired quantity of ELs, may be beneficial in enabling a consumer to incrementally improve the playback quality of the video with each successive EL it is able to obtain prior to decoding.

FIG. 2 illustrates the bit stream and the attendant sub-streams 38 being provided to the producer for subsequent delivery to the consumer according to the request-response principles of ICN using interests (I) to request individual packets associated with the sub-streams for delivery in corresponding content objects (C). The bitstream 38 for each segment is referenced for descriptive purposes as being divisible into one or more packets, i.e., bytes or bits of data, for subsequent transport within payloads of corresponding content objects without intending to limit the scope and contemplation of the present invention as data resulting from the encoding or otherwise derived from coding of the media 40 may be otherwise organized or referenced for inclusion within the content objects. The quantity of interests and resulting content objects utilized to request each packet associated with a particular layer of a segment ($L_0, L_1, L_2, L_3 \ldots L_N$) may be a design parameter selected according to operational needs. ICN enables a payload size of the content objects to be of virtually any size such that the quantity or the size of packets carried therein may be selectable according to desired throughput. One non-limiting aspect of the present invention contemplates leveraging the payload capability of the content objects to enable each layer ($L_0, L_1, L_2, L_3 \ldots L_N$) to be carried within a single content object, i.e., a one-to-one relationship between the layers ($L_0, L_1, L_2, L_3 \ldots L_N$) and the content objects such that each layer can be requested with issuance of a singular interest. As an example, an encoding scheme utilizing 2 second segment durations and utilizing 20 KB as the payload size for ICN content objects, could encode layers that increment the video encoding rate by 80 kbps.

Figure 4:
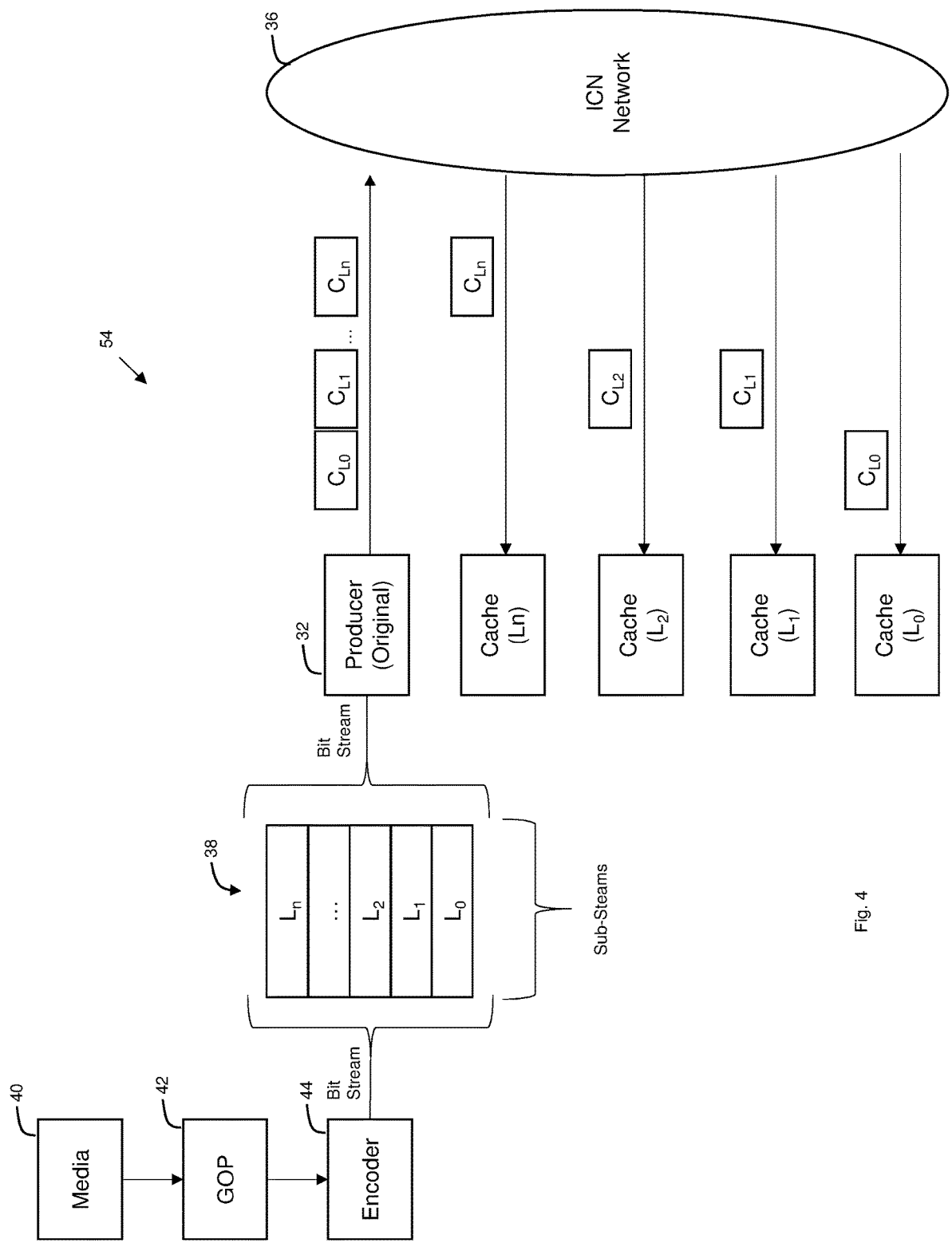
FIG. 4 illustrates a diagram for media streaming in accordance with one non-limiting aspect of the present invention.

FIG. 4 illustrates a diagram 54 for media streaming in accordance with one non-limiting aspect of the present invention. The diagram 54 illustrates the video 40 described in FIG. 2 being cached at a plurality of nodes (labeled as Cache) within the ICN, optionally prior to be requested by a consumer and/or after being requested by a consumer. The caching may be performed in anticipation of additional consumers requesting the corresponding video, such as in the manner described in U.S. patent application Ser. No. 15/345,333, entitled Preemptive Caching of Content in a Content-Centric Network. The caching may also be facilitated by including caching information within previously transmitted content objects to instruct nodes forwarding the content object to store the content objects within their content stores and/or by the network administrator 24 or other entity transmitting the content objects to particular nodes in advance of attendant interests being received. FIG. 4 illustrates the content objects being issued without corresponding interests to exemplarily describe the capabilities of the present invention to facilitate caching individual layers ($L_0, L_1, L_2, L_3 \ldots L_N$) prior being requested by additional consumers. The caching may be beneficial in enabling the layers ($L_0, L_1, L_2, L_3 \ldots L_N$) to be distributed/stored throughout nodes in the ICN, and optionally at edge or boundary nodes close to the consumers, so as to minimize time and core network bandwidth needed to forward the content objects to the consumers when requested.

Figure 5:
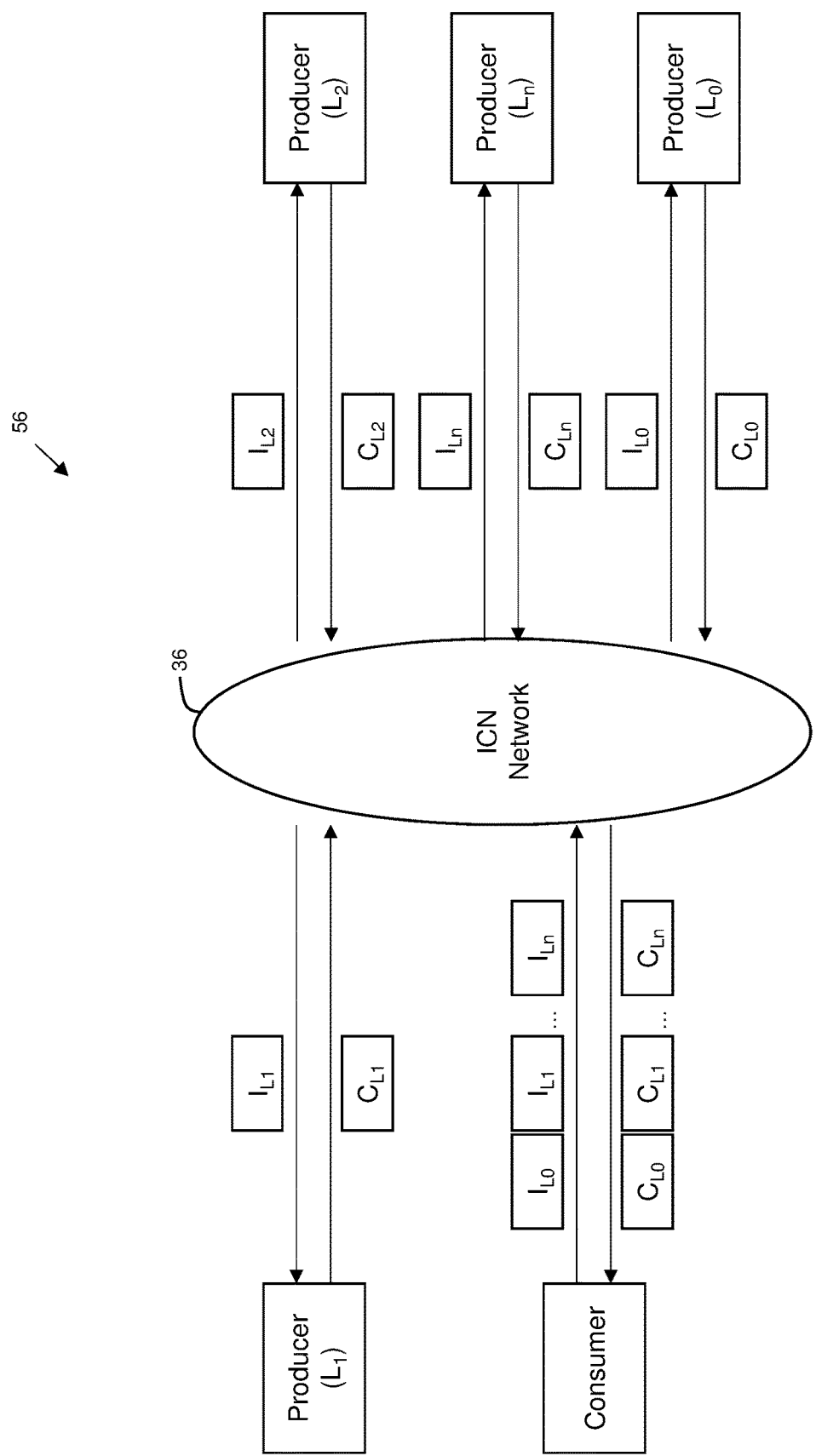
FIG. 5 illustrates a diagram for media streaming in accordance with one non-limiting aspect of the present invention.

FIG. 5 illustrates a diagram 56 for media streaming in accordance with one non-limiting aspect of the present invention. The diagram 56 illustrates a consumer transmitting a plurality of interests (I) over the network according to ICN principles to request corresponding content objects. The diagram 56 illustrates a plurality of producers, which may be associated with the same or different nodes in the network, responding with corresponding content objects. The number of interests issued for a particular one of the players ($L_0, L_1, L_2, L_3 \ldots L_N$) may vary depending on the number of packets associated with the corresponding segment such that the singular interest/content object being illustrated for each layer ($L_0, L_1, L_2, L_3 \ldots L_N$) is exemplary as multiple interest/content objects may be required to facilitate streaming each layer ($L_0, L_1, L_2, L_3 \ldots L_N$). The diagram 56 differs from those illustrated above with the originator of the video and the attendant encoding being omitted for purposes of illustrating one non-limiting aspect of the present invention whereby the video may be streamed entirely from resources in the network 38 without requiring corresponding streaming from the original media source and/or contemporaneous encoding of the bitstream associated therewith.

Figure 6:
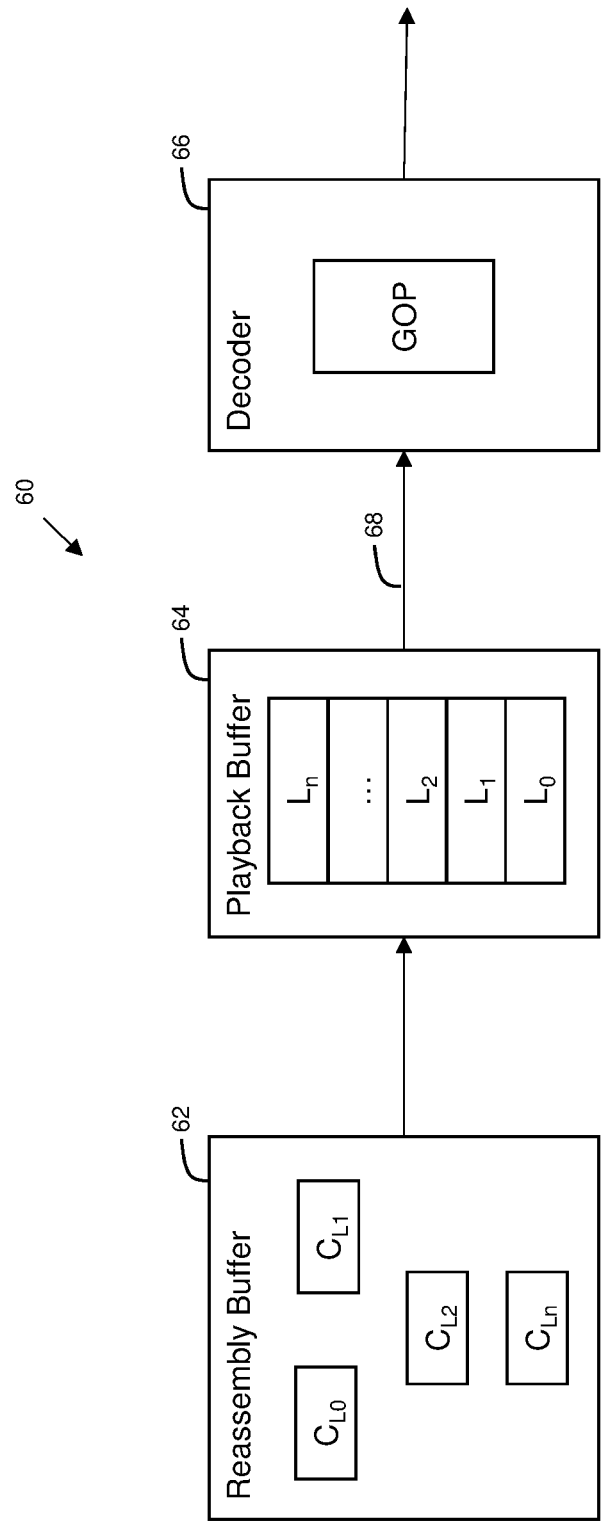
FIG. 6 illustrates a diagram of a consumer in accordance with one non-limiting aspect of the present invention.

FIG. 6 illustrates a diagram 60 of a consumer in accordance with one non-limiting aspect of the present invention. The consumer 60 may include a non-transitory, computer-readable medium (not shown) having a plurality of non-transitory instructions stored thereon for execution with an attendant processor (not shown) and circuitry/hardware (not shown) sufficient to facilitate the processes, operations, etc. attendant to the functionally illustrated reassembly buffer 62, playback buffer 64 and decoder 66. The reassembly buffer 62 may correspond with a capability of the consumer to assemble the content objects prior to forwarding the contents, packets, etc. therein to the playback buffer 64. The reassembly buffer 62 may include capabilities sufficient for organizing or otherwise resequencing the content objects into an ordered set associated with the monotonically encoded layers ($L_0, L_1, L_2, L_3 \ldots L_N$). The reassembly buffer 62 may be tasked with determining whether a sufficient number of content objects have been received for a particular layer ($L_0, L_1, L_2, L_3 \ldots L_N$) of each segment before forwarding the attendant packets to the playback buffer 64. The reassembly buffer 62 may be configured to assemble the content objects associated with any fully received layer ($L_0, L_1, L_2, L_3 \ldots L_N$) to the playback buffer 64 and to discard any content objects associated with incompletely received layers ($L_0, L_1, L_2, L_3 \ldots L_N$), i.e., the reassembly buffer 62 may receive content objects sufficient for entirely receiving a second EL ($L_2$) and partially receiving a third EL ($L_3$) such that the packets associated with the layers up to $L_2$ are forwarded to the playback buffer 64 and the remaining packets associates with $L_3$ and above are discarded.

The playback buffer 64 may be tasked with processing the packets associated with each received content object into a media stream 68 sufficient for output to the decoder 66. One non-limiting aspect of the present invention contemplates the reassembly buffer 62 discarding any content objects associated with incompletely received layers ($L_0, L_1,$ $L_2, L_3 \ldots L_N$) prior to forwarding the attendant packets to the playback buffer 64 for assembly into the media stream 68 for exemplary purposes as the playback buffer 64 may include similar capabilities to limit the media stream 68 to completely received layers ($L_0, L_1, L_2, L_3 \ldots L_N$). The playback buffer 64 is shown to be functioning differently than the reassembly buffer 62 for non-limiting purposes in order to demonstrate the capability to differentiate a receiving stage associated with obtaining the content objects from a processing stage or a formulation stage whereby the packets, data, etc. included in the content objects are processed into the media stream 68 usable according to processing capabilities of the decoder 66. The differentiation between the reassembly buffer 62, the playback buffer 64 and the decoder 66 may be functional to demarcate separation of processes associated with receiving content objects from processes associated with combining content objects into the media stream for playback, i.e., to accommodate the request-response protocol resulting in some content objects being received after a need arises for forwarding the associated segment to the decoder 68.

The decoder 68 may be configured in accordance with the scalable coding performed at the encoder 44 to facilitate playback of the bitstream and the sub-streams 68 being output from the playback buffer 64. The decoder 66 may include capabilities sufficient for processing the interconnection of the layers ($L_0, L_1, L_2, L_3 \ldots L_N$) to facilitate playback of the video according to the quality associated with a highest one of the ELs. The decoder 66 may operate differently depending on the access units, etc. utilized to separate the original, high-quality video 40 for encoding and is shown for non-limiting purposes with respect to recovering the GOP associated with each segment and the quality thereof depending on the quantity of layers ($L_0, L_1, L_2, L_3 \ldots L_N$) within the media stream 68 being provided thereto. The decoder 66 is shown to be separate from the reassembly buffer 62 and the playback buffer 64 for exemplary purposes as the present invention fully contemplates operations or processes associated therewith being performed in any other manner whereby sufficient capabilities exist to facilitate recovering the sub-streams associated with the layers ($L_0, L_1, L_2, L_3 \ldots L_N$) included within the media stream 68, i.e., capability to facilitate recovering the pictures, frames, audio, video, etc. being generated at the consumer in response to the content objects obtained over the network 36 according to ICN principles.

Figure 7:
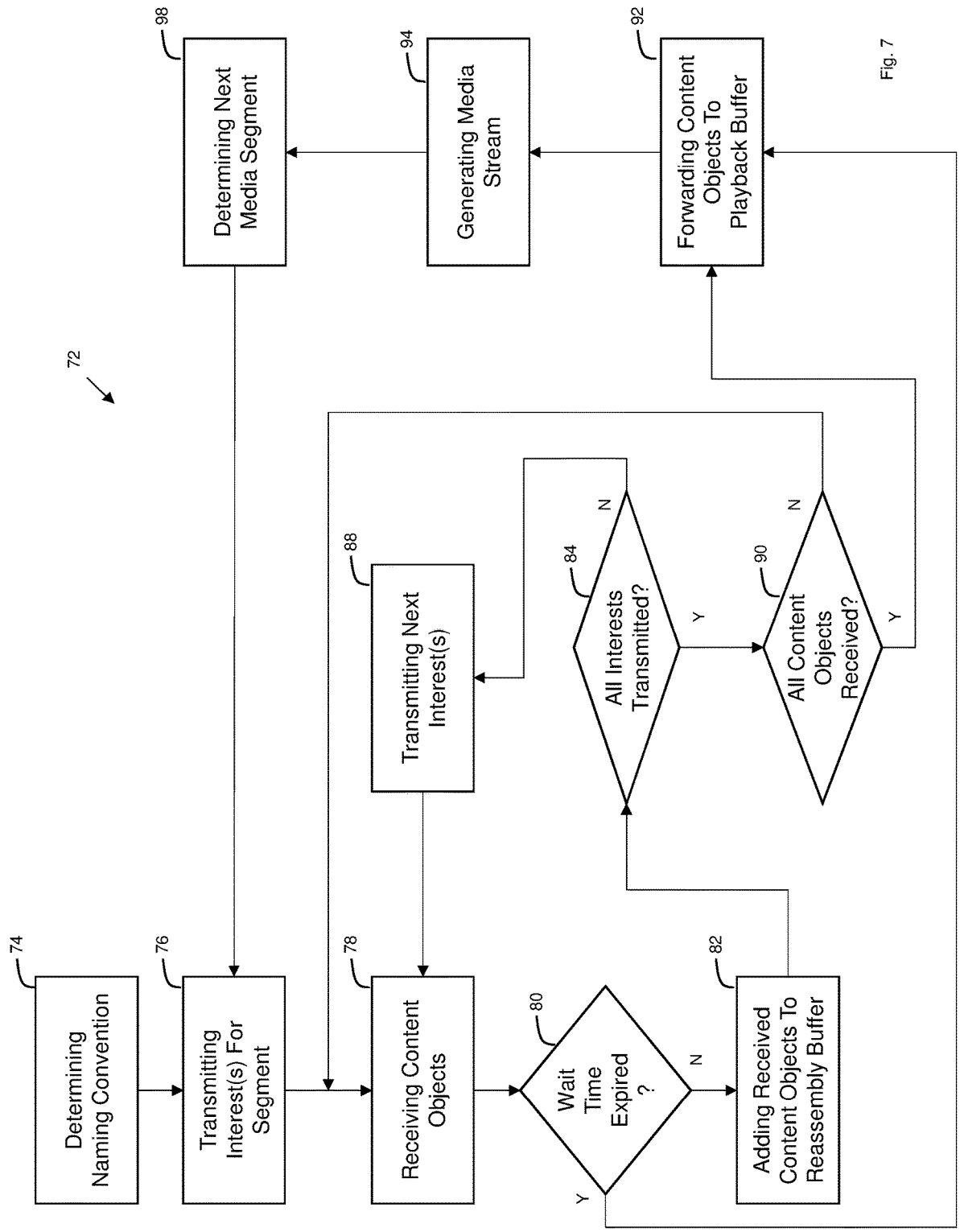
FIG. 7 illustrates a flowchart of a method for ICN based streaming of media in accordance with one non-limiting aspect of the present invention.

FIG. 7 illustrates a flowchart 74 of a method for ICN based streaming of media in accordance with one non-limiting aspect of the present invention. The method contemplates leveraging capabilities associated with the request-response protocol associated with ICN principles, and particularly the capability to facilitate in-line caching of content objects to facilitate distributed storage and connectionless retrieval of scalably coded media having infinite scalability, i.e., infinite granularity in the quality and quantity of coded layers ($L_0, L_1, L_2, L_3 \ldots L_N$) facilitating media transport. Unlike connection-based methodologies whereby a connection and its attendant state information is maintained between a source and destination, such as according to IP principles utilized in the Transfer Control Protocol (TCP), the connection-less capabilities of the present invention allows for content objects to be transmitted from any producer, and automatically a producer closest to the consumer, without requiring the consumer to maintain a connection or other state for the producer and without requiring the consumer to determine addressing or other network-dependent knowledge needed to continue communication with the producer. The request-response protocol of ICN enables consumers in accordance with the present invention to request content in an information-centric manner whereby the consumer need only ascertain naming information associated with the desired content.

Block 74 relates to determining a naming convention utilized to facilitate requested the encoded media. The naming convention relates to naming needed to request a particular piece of content, i.e., a packet, container or other demarcation of the layers encoded for each segment of the media, in accordance with ICN. The naming may be hierarchical and/or utilize wildcards or other prefixes to facilitate a consumer issuing a corresponding interest for obtaining the related content objects. An ordered list of content objects or a manifest associated with a particular piece of media may be obtained by the consumer, such as through a webpage or other user interface associated with media selection, to facilitate identifying the names or the naming convention required for the attendant user to facilitate issuance of the interest needed to request the content objects associated with the scalably encoded layers ($L_0, L_1, L_2, L_3 \ldots L_N$) of the media. The ordered list may specify a monotonically arranged listing of names and/or naming wildcards/prefixes needed by the consumer to sequentially transmit the appropriate interest(s) in order to sequentially requests the layers ($L_0, L_1, L_2, L_3 \ldots L_N$) successively according to increasing quality levels. One non-limiting aspect of the present invention contemplates the consumer being enabled to obtain/request a highest quality version of the media, i.e., a highest EL, available for transmission thereto given current network bandwidth/conditions without having a priori knowledge of available bandwidth or a guarantee of available bandwidth.

The consumer may utilize the ordered list to facilitate transmitting as many interests as possible or necessary to request the segments of the media at the highest quality EL such that the content objects provided in response thereto may then dictate the quality of the media stream provided to the decoder. A time limit, such as one set based on a size of the playback buffer or a duration of the corresponding segment, may specify a time period during which the content objects received in response to the interests may be processed for output to the decoder prior to being discarded, i.e., the consumer may transmit as many interest as possible or reasonable over a given time period without regard to available bandwidth and thereafter utilize the responsive content objects to define quality as opposed to estimating whether network conditions can support an uninterrupted or satisfactory/pleasing delivery of the desired quality level prior to requesting streaming of the related media. Block 76 relates to a consumer transmitting the interest in accordance with the ordered list for each segment associated with a media desired for playback. The request-response protocol may require the consumer to individually request the packets associated with each segment according to the naming convention associated therewith. The transmission of interests may be ordered according to the ordered list such that the interests associated with one segment are transmitted prior to the interests associated with a next segment until all the interests associated with the ordered list are transmitted or prevented from being transmitted due to the time interval allotted to each segment expiring.

While issuing all the interests included in the ordered list for a particular segment at once is contemplated, one non-limiting aspect of the present invention contemplates an initial phase whereby a predefined quantity of interests are initially transmitted before subsequent interests are transmitted. An in-flight window strategy may define a maximum number of interests outstanding at any one time such that the initial phase may correspond with transmitting a sufficient quantity of interest to meet the maximum, in-flight number of interest, and then waiting until one or more content objects are received before one or more of the interest(s) occurring next in the ordered list are transmitted. This staggering or initially limited set of interest transmissions may be beneficial in metering network resources being consumed at any one time to facilitate interest transmissions. Block 78 relates to the consumer receiving/waiting for content objects transmitted in response to the outstanding interests to be received. While waiting for the content objects, a wait time may be monitored in Block 80 to determine whether an allotted period of time has expired before the consumer needs to begin issuing interest for a next segment of the media as defined in the ordered list. The wait time may be specified based on a size of the playback buffer or other requirements associated with time/processing needed to recover and buffer the packets from the content objects to assure continuous, uninterrupted or other desired standard for playback of the media.

Block 82 relates to the consumer adding the content objects received prior to expiration of the wait time to the reassembly buffer whereat the packets included therein may be recovered and held for processing, sequencing, etc. before being handed off to the playback buffer for composition into the media stream required by the decoder for facilitating playback of the media. Block 84 relates to the consumer determining whether all interest in the ordered list for the segment being requested have been transmitted, i.e., whether additional time is available to facilitate issuance of additional interest. One non-limiting aspect of the present invention contemplates operating according to a media-maximization strategy whereby the consumer issues as many interest as possible within the allotted period of time for purposes of attempting to obtain the content objects associated with the highest EL. The media-maximization strategy may be implemented without assessing bandwidth or other network conditions before requesting the highest EL by avoiding specificity on the desired version and instead monotonically issuing the interest according to the ordered list as time permits. The highest EL obtained in the content objects received prior to expiration of the wait time in Block 80 may automatically define a maximum version of the media currently available according to the media-maximization strategy. One non-limiting aspect of the present invention contemplates the scalable coding producing a large number of layers ($L_0, L_1, L_2, L_3 \ldots L_N$) such that the difference in quality is from one layer to the next may be imperceptible or of a nature tolerated by a viewer. A consistency-maximization strategy may alternatively be implemented instead of the media-maximization strategy when it may be desirable to limit segment-to-segment variations in the highest EL by instead capping or limiting the interests to a particular EL, such as one determined over time as being reasonable attainable by the consumer based on historical performance.

Block 88 relates to the consumer issuing the next interest(s) in the order list when the wait time is unexpired and less than all of the interests have been transmitted, i.e., less than all the interest defined according to the media-maximization or the media-consistency strategy have been issued. The transmission of the next interest(s) may occur in a one-to-one manner, a one-to-many manner or according to additional strategies whereby the number of interests transmitted following receipt of a content object may be specifiable. The one-to-one manner may correspond with transmitting one interest in response to receipt of each content object, which may be beneficial in maintaining the in-flight window without increasing the number of interests outstanding at any one time. The one-to-many manner may correspond with transmitting two or more interests in response to receipt of each content object, which may be beneficial in increasing the number of interests outstanding as the number of received content objects increases. The monotonically controlled transmission of the interests may result in the BL and lower ELs being received before the higher ELs, and the number of interests outstanding initially may be limited to minimize the time needed to obtain the lower-layer content objects.

Block 90 relates to the consumer assessing whether all the content objects associated with the interests in the order list for the current segment have been received. Block 88 may be returned to an event of the content objects have not been received to keep waiting for the receipt thereof and/or expiration of the wait time in Block 80. Block 92 relates to forwarding the packets recovered from the content objects added to the reassembly buffer to the playback buffer for composition into the media stream in Block 94. The packets being forwarded from the reassembly buffer is shown to occur after all of the content objects are received, which may create a series of packets beyond the buffering capabilities of the playback buffer such that it may be desirable to prevent collection of the content objects for the next segment until the content objects of the current segment can be provided to the playback buffer. A deficit determination may optionally be employed to signify a time suitable to begin collecting the content objects for the next segment, which may be set so as to ensure the packets of the next segment are delivered to the playback buffer before the playback buffer runs out of packets for the current segment, i.e., to assure an uninterrupted, continuous playback of the media. Block 98 relates to the consumer determining from the naming convention and/or the ordered list the naming for the interests needed to request the next segment whereupon the process restarts.

As supported above, per ICN architectures such as CCN or NDN, a container (such as a file) may broken into individual content objects (conceptually equivalent to packets) that are each uniquely named. A client device may retrieve each individual content object for a media desired for streaming by sending an Interest packet identifying the desired content object by name. The network may route the Interest packet toward the content origin, but any node along the path can satisfy the Interest by returning the named content object from its local cache. The reliable video client may be informed (via a content manifest) of the segment duration (Tc) and the names of the individual containers (or a naming pattern in the case that the client can automatically generate container names that match the encoder's naming), and it may sequentially retrieve the individual containers (or portions thereof) making up the a/v stream. The goals of the client may be to begin playback as quickly as possible once the asset has been selected and ensure to a high degree of confidence that once playback begins that it retains enough data in its playback buffer to prevent playback stalling. Since the client may be aware of Tc, one implementation may be that the client begins retrieving the content objects of a segment/container "n" at a certain time Tn, beginning with the initial content objects (and thus the base layer of encoding) and progressing in a linear fashion through the content objects (and thus monotonically increasing video quality), and then ceases retrieving content objects for container n at time Tn+1=Tn+Tc, at which time it begins retrieving content objects for segment/container "n+1".

In general, on a constrained or variable bandwidth channel, the client may not retrieve the entire container, but may have received a portion containing at least the base layer encoding, and possibly one or more enhancement layers. In an idealized implementation, each content object received for a specific container may contain useful NV data that can be utilized to benefit the rendered AN quality, such that the rendered video could be considered almost infinitely scalable in quality between the quality of the base layer encoding, and the maximum quality encoded. In current SVC and SHVC encodings it may be required that the content is prepared in discrete levels of encoding rather than in this idealized continuous format. In that case, the client could be optimized such that it ceases retrieving content objects for segment n prior to Tn+1, if it determines that it may be unlikely to complete retrieval of the next discrete level of encoding. Since each client may follow the same process in retrieving content objects in monotonically increasing order from each container and ceasing retrieval after some number of object may be retrieved, an ICN node with in-line caching capability would thus have a similarly monotonically increasing probability of seeing (and hence caching) each content object. Thus, subsequent clients retrieving the same segment may have the highest probability of retrieving base-layer content objects from a nearby cache node, and as it progresses further into enhancement layers, a lower probability of retrieving content object from the nearby cache node.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for Information Centric Networking (ICN) based streaming of media, the media including a plurality of content objects, each content object of the plurality of content objects including at least a portion of the media, the method comprising the steps of:
controlling playback of each content object of the plurality of content objects received at a device based on wait times individually associated with each of the plurality of content objects, respectively, including the device the (i) playing back one or more content objects received before expiration of a respective wait time associated with a particular content object, and (ii) discarding, without playback, content objects received after expiration of the wait time associated therewith;
determining a request to begin playback of the media at the device; and
transmitting a plurality of interests over an ICN network to request transmission of one or more of the content objects to the device,
wherein the step of transmitting is executed according to response-request strategy, such that (i) a predefined first number of interests of the plurality of interests are initially transmitted, and (ii) transmission of a second number of remaining interests, in excess of the first number, are delayed until at least one of the content objects associated with the initially transmitted interests is received by the device, and wherein each remaining interest is thereafter transmitted on a one-by-one basis until (i) each of the remaining interests are transmitted, or (ii) the wait time for the content object associated with the respective remaining interest expires.

2. The method of claim 1, further comprising a step of determining a naming convention for the plurality of interests sufficient to uniquely request each of the content objects according to a name associated therewith.

3. The method of claim 2, further comprising a step of transmitting at once all interests defined according to the naming convention.

4. The method of claim 2, further comprising a step of sequentially transmitting all interests according to an ordered list defined according to the naming convention.

5. The method of claim 2, wherein the step of transmitting the interests is further executed according to a consistency strategy, wherein the consistency strategy relying is based on historical performance limited to interests needed to maintain a consistent version of the media for playback as measured according to resolution, frame rate, compression and/or quality.

6. The method of claim 2, wherein the step of transmitting the interests is further executed according to an in-flight window, wherein the in-flight window limits a quantity of outstanding interests to a maximum third number such that no more than the maximum third number is outstanding at any one time, wherein a particular interest is considered to be outstanding until receipt, at the device, of the content object associated therewith.

7. A method for Information Centric Networking (ICN) based streaming of media, the media including a plurality of content objects each content object of the plurality of content objects including at least a portion of the media, the method comprising the steps of:
controlling playback of each content object of the plurality of content objects received at a device based on wait times individually associated with each of the plurality of content objects, respectively, including the device (i) playing back one or more content objects received before expiration of a respective wait time associated with a particular content object, and (ii) discarding, without playback, content objects received after expiration of the wait time associated therewith;
determining a request to begin playback of the media at the device;
transmitting a plurality of interests over an ICN network to request transmission of one or more of the content objects to the device; and
wherein the step of transmitting is executed according to a response-request strategy, such that (i) a predefined first number of interests of the plurality of interests are initially transmitted, and (b) transmission of a second number of remaining interests, in excess of the first number, are delayed until at least one of the content objects associated with the initially transmitted interests is received by the device, and
wherein each remaining interest is thereafter transmitted on a one-to-many basis until (i) each of the interests are transmitted or, (ii) the wait time for the content object associated the respective remaining interest expires.

8. The method of claim 1, further comprising a step of defining each wait time according to a buffer-control strategy such that each wait time depends on a quantity of received content objects within a playback buffer.

9. The method of claim 8, further comprising a step of decreasing the wait time when the playback buffer is operating at a deficit, the deficit occurring when the quantity of packets in the playback buffer is (i) less than a threshold value, or (ii) below a range of values.

10. The method of claim 9, further comprising a step of increasing the wait time when the quantity of packets in the playback buffer (i) exceeds the threshold value, or (ii) is above the range of values.

11. A server for Information Centric Networking (ICN)-based streaming of media, the media including a plurality of content objects, each content object of the plurality of content objects including at least a portion of the media, comprising:
a processor; and
a memory configured with computer executable instructions stored therein, which, when executed by the processor, cause the server to:
control playback of each content object of the plurality of content objects received at a device based on wait times individually associated with each of the plurality of content objects, respectively, including the device (a) playing back one or more content objects received before expiration of a respective wait time associated with a particular content object, and (b) discarding, without playback, content objects received after expiration of the wait time associated therewith;
determine a request to begin playback of the media at the device; and
transmit, according to response-request strategy, a plurality of interests over an ICN network to request transmission of one or more of the content objects to the device, such that (a) a predefined first number of interests of the plurality of interests are initially transmitted, (b) transmission of a second number of remaining interests, in excess of the first number, are delayed until at least one of the content objects associated with the initially transmitted interests is received by the device, and (c) each remaining interest is thereafter transmitted until (i) all of the remaining interests are transmitted, or (ii) the wait time for the content object associated with the respective remaining interest expires.

12. The method of claim 11, wherein the instructions further cause the server to determine a naming convention for the plurality of interests sufficient to uniquely request each of the content objects according to a name associated therewith.

13. The method of claim 12, wherein the instructions further cause the server to transmit at once all interests defined according to the naming convention.

14. The method of claim 12, wherein the instructions further cause the server to sequentially transmit interests according to an ordered list defined according to the naming convention.

15. The method of claim 11, wherein the instructions further cause the server to transmit the interests according to a consistency strategy, wherein the consistency strategy is based on historical performance limited to interests needed to maintain a consistent version of the media for playback according to resolution, frame rate, compression and/or quality.

16. The method of claim 11, wherein the instructions further cause the server to transmit the interests according to an in-flight window, wherein the in-flight window limits a quantity of outstanding interests to a maximum third number, such that no more than the maximum third number is outstanding at any one time, wherein a particular interest is considered to be outstanding until receipt, at the device, of the content object associated therewith.

17. The method of claim 11, wherein the instructions further cause the server to define each wait time according to a buffer-control strategy each wait time depends on a quantity of received content objects within a playback buffer.

18. The method of claim 17, wherein the instructions further cause the server to decrease the wait time when the playback buffer is operating at a deficit, the deficit occurring when the quantity of packets in the playback buffer is (i) less than a threshold value, or (ii) below a range of values.

19. The method of claim 18, wherein the instructions further cause the server to increase the wait time when the quantity of packets in the playback buffer (i) exceeds the threshold value, or (ii) is above the range of values.

20. The method of claim 11, wherein the instructions further cause the server to transmit each remaining interest, according to the response-request strategy, on a (i) one-to-one basis, or (ii) a one-to-many basis.

* * * * *